US011860951B2

(12) United States Patent
Blanchflower et al.

(10) Patent No.: US 11,860,951 B2
(45) Date of Patent: Jan. 2, 2024

(54) OPTIMIZATION OF A FILE FORMAT

(71) Applicant: MICRO FOCUS LLC, Santa Clara, CA (US)

(72) Inventors: Sean Blanchflower, Cambridge (GB); Brian Cowe, Cambridge (GB); Joel Peter Dockray, Cambridge (GB)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/492,079

(22) Filed: Oct. 1, 2021

(65) Prior Publication Data

US 2023/0104354 A1    Apr. 6, 2023

(51) Int. Cl.
*G06F 16/93* (2019.01)
*G06F 16/9035* (2019.01)
*G06F 16/11* (2019.01)

(52) U.S. Cl.
CPC .......... *G06F 16/93* (2019.01); *G06F 16/9035* (2019.01)

(58) Field of Classification Search
None
See application file for complete search history.

(56) References Cited

U.S. PATENT DOCUMENTS

| | | | |
|---|---|---|---|
| 5,737,599 A | 4/1998 | Rowe et al. | |
| 8,125,997 B1* | 2/2012 | Greene | H04L 47/10 370/386 |
| 11,030,149 B2 | 6/2021 | Rupp et al. | |
| 11,087,188 B2 | 8/2021 | Truong et al. | |
| 2010/0070448 A1* | 3/2010 | Omoigui | H01L 27/1463 706/55 |
| 2014/0380171 A1* | 12/2014 | Maloney | G06F 3/04847 715/732 |

FOREIGN PATENT DOCUMENTS

| | | |
|---|---|---|
| CN | 111597155 | 8/2020 |
| EP | 1811400 | 5/2009 |

OTHER PUBLICATIONS

Haris Volos; Aerie: flexible file-system interfaces to storage-class memory; ACM; 2014; pp. 1-14 (Year: 2014).*
Author Unknown: "Linearized PDF is a Special Way to Organize a PDF File"; IDR Solutions; Feb. 2010; 6 pages.
Author Unknown: "What is PDF Linearization?"; Contact Sales-PDFTron; Copyright 2001; 12 pages.
Mike Bremford; "How to Optimize Your PDF's for Serving Over the Web"; Linearized PDF—BFO PDF Library 2.26—a significant release; Jul. 2021; 4 pages.

* cited by examiner

*Primary Examiner* — Albert M Phillips, III
*Assistant Examiner* — Jermaine A Mincey
(74) *Attorney, Agent, or Firm* — Sheridan Ross P.C.

(57) ABSTRACT

A request to send a file is received. A file type for the file is identified. For example, the file type may a Joint Photographic Experts Group (JPEG) file or a Portable Document Format (PDF) file. In response to receiving the request to send the file and identifying the file type for the file, a format of the file is reordered. Reordering the format of the file is based on an application and/or an application type that will be receiving the file. For example, the application may be an Adobe Acrobat® reader that is receiving a PDF file that has been reordered for more efficient reading.

20 Claims, 2 Drawing Sheets

OPTIMIZATION OF A FILE FORMAT

BACKGROUND

There are a variety of file formats. For many file formats, the order of information in the files may vary based on how the file is created, used, and/or modified. This leads to varying formats that are not always formatted in a manner that is complementary to the application that is receiving the file. As a result, file access time may be greatly reduced depending upon how the file is used. This is especially true when files are sent over a network.

SUMMARY

These and other needs are addressed by the various embodiments and configurations of the present disclosure. A request to send a file is received. A file type for the file is identified. For example, the file type may a Joint Photographic Experts Group (JPEG) file or a Portable Document Format (PDF) file. In response to receiving the request to send the file and identifying the file type for the file, a format of the file is reordered. Reordering the format of the file is based on an application and/or an application type that will be receiving the file. For example, the application may be an Adobe Acrobat® reader that is receiving a PDF file that has been reordered for more efficient reading.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

As defined herein and in the claims, the term "send" may include streaming a file. For example, sending a video file may comprise streaming the video file.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
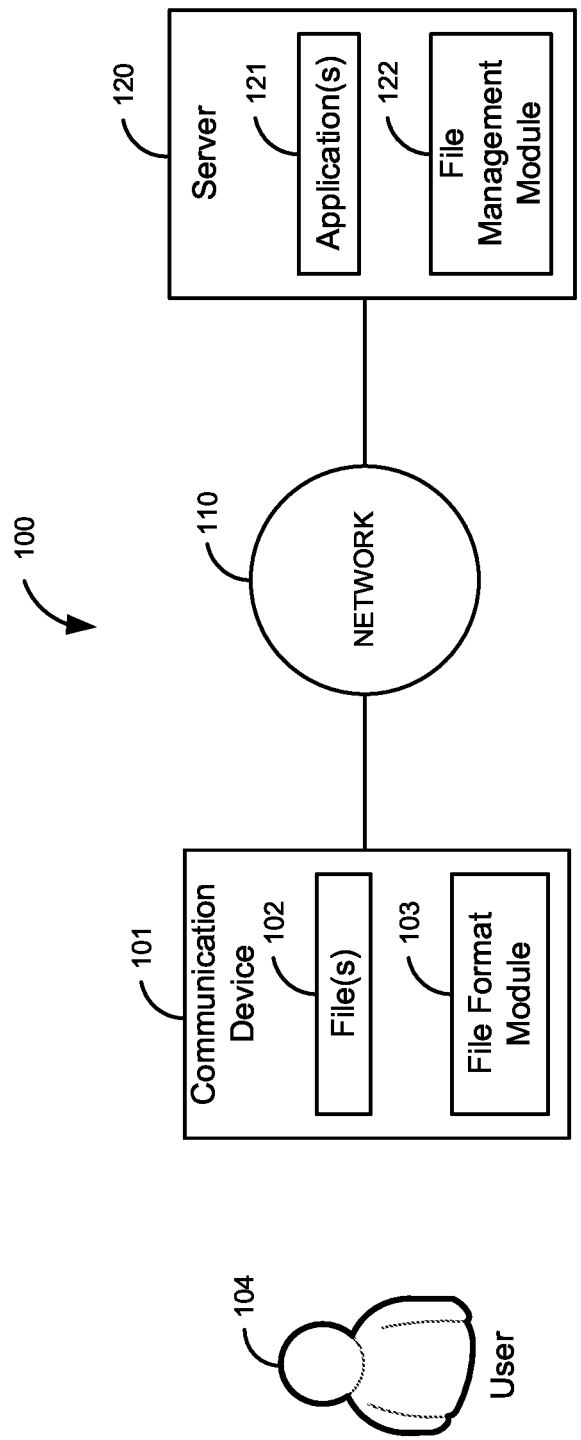
FIG. 1 is a block diagram of a first illustrative system for optimization of a file format.

FIG. 1 is a block diagram of a first illustrative system 100 for optimization of a file format. The first illustrative system 100 comprises a communication device 101, a network 110, and a server 120.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, and the like. Although FIG. 1 only shows a single communication device 101, any number of communication devices 101 may be connected to the network 110.

The communication device 101 further comprises files 102 and a file format module 103. The file(s) 102 may be any type of file 102, such as, a ZIP file 102 (e.g., a Microsoft Word® document), a Portable Document Format (PDF) file 102, a Joint Photographic Experts Group (JPEG) file 102, a Portable Network Graphics (PNG) file 102, a Graphical Interchange Format (GIF) file 102, a Scalable Vector Graphics (SVG) file 102, a Moving Picture Experts Group (MP) 4 file 102, an Extended Markup (XML) file 102, a Waveform Audio file format (WAVE) file 102, a Microsoft® Outlook Item (MSG) file 102, a Tape Archive (TAR) file 102, and/or the like. The file(s) 102 may be in the form of a stream of information (e.g., bytes) that are passing through the communication device 101. There may be any number of types of files 102 on the communication device 101 where each file 102 has a different file format.

The file format module 103 can be any software coupled with hardware that can modify the format of the files 102. The file format module 103 may modify the format of a file 102 in various ways that conforms to the file format. Alternatively, the file formation module 103 may use a proprietary format when changing the file format.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), H.323, Session Initiation Protocol (SIP), and/or the like. Thus, the network 110 is an electronic communication network configured to carry messages via packets and/or circuit switched communications.

The server 120 may be any hardware coupled with software that provides the application(s) 121 to the communication device 101, such as, a database server, a communication server, an email server, an application server, a web server, a voice mail server, and/or the like. The server 120 further comprises application(s) 121 and a file management module 122.

The application(s) 121 may comprise any application 121 that can use the files 102, such as, a word processing application 121, a spreadsheet application 121, a database application 121, an email application 121, a web application 121, a document processing application 121, a video application 121, a chat application 121, a voice communication application (e.g., a voice mail application) 121, and/or the like. The application(s) 121 may be able to use files 102 that have different file formats. For example, the application 121 may be an email application that can have one or more attachments that are in different kinds of formats (e.g., PDF, GIF, ZIP, etc.). Although not shown, an application 121 may also reside on the communication device 101.

The file management module 122 works with the file format module 103 to notify the file format module 103 how to modify the format of the file(s) 102 so that the file(s) 102 are in the best format for the application 121 when the file(s) 102 are received by the application 121.

Although not shown, the files 102/file format module 103 may reside on the server 120 and the application(s) 121/file management module 122 may reside on the communication device 101 (the reverse of FIG. 1).

Figure 2:
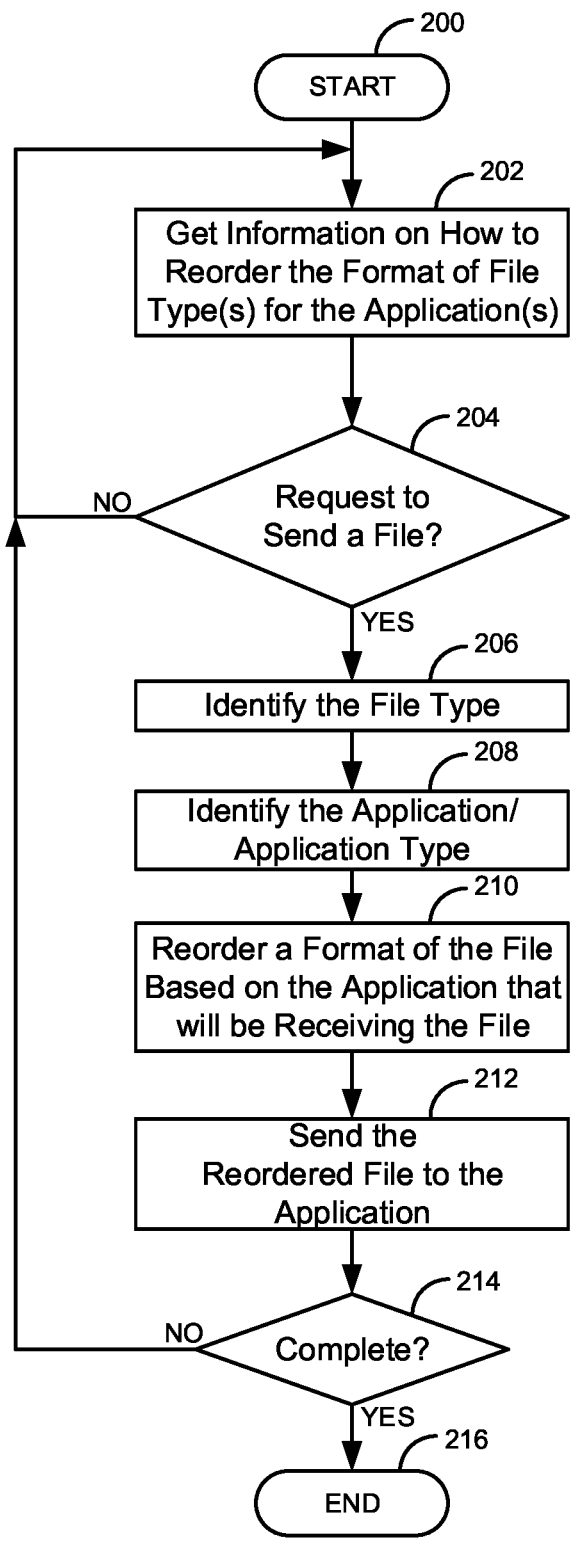
FIG. 2 is a flow diagram of a process for optimization of a file format.

FIG. 2 is a flow diagram of a process for optimization of a file format. Illustratively, the communication device 101, the file(s) 102, the file format module 103, the server 120, the application(s) 121, and the file management module 122 are stored-program-controlled entities, such as a computer or microprocessor, which performs the method of FIG. 2 and the processes described herein by executing program instructions stored in a computer readable storage medium, such as a memory (i.e., a computer memory, a hard disk, and/or the like). Although the method described in FIG. 2 is shown in a specific order, one of skill in the art would recognize that the steps in FIG. 2 may be implemented in different orders and/or be implemented in a multi-threaded environment. Moreover, various steps may be omitted or added based on implementation.

The process starts in step 200. The file format module 103 gets information on how to reorder the format of the file type(s) for the application(s) 121 in step 202. For example, the file format module 103 may receive the format information from the file management module 122, directly from the application(s) 121, from a user 104 at the communication device 101, from a configuration file, and/or the like. The information on how to reorder the file format for the file type(s) may be different based a variety of different criteria. The information on how to reorder the file format may be static, dynamic, or a combination of the two depending upon implementation.

To illustrate, below is an exemplary file dump of a snippet of an actual a Microsoft PowerPoint® file 102 (which stored in a ZIP format).

[Content_Types].xml
_rels/.rels
ppt/presentation.xml
ppt/slides/slide42.xml
ppt/slides/slide43.xml
ppt/slides/slide44.xml
ppt/slides/slide45.xml
ppt/slides/slide46.xml
ppt/slides/slide47.xml
ppt/slides/_rels/slide20.xml.rels
ppt/slides/slide1.xml
ppt/slides/slide2.xml
ppt/slides/slide3.xml
ppt/slides/slide4.xml
ppt/slides/slide5.xml ppt/slides/slide6.xml
ppt/slides/slide7.xml As can be seen, the ordering of the slides (i.e., an object) in the PowerPoint® file 102 is not in the order that would normally be used if a user 104 wanted to display the slides from the beginning at slide 1. The actual file format of the PowerPoint® file 102 varies based how the PowerPoint® presentation is created and modified. A problem that exists if the file 102 is sent over the network 110 to the application 121 without the file format being reordered, the slides 42-47 would have to be received first before slide one is received. As a result, the delay in loading and displaying the PowerPoint® file 102 may take much longer than if the file format is reordered so that the slides appear in a contiguous order beginning at slide 1 and going to slide 47. This becomes even more noticeable if there is congestion and/or limited bandwidth in the network 110.

Another example is shown below of a snippet of a dump of an actual Microsoft Word® file 102 (also in a ZIP format). Here, the file format is based on objects of the Microsoft Word® file 102. The Microsoft Word® file 102 contains the text and Portable Network Graphics (PNGs) that are actual images within the Microsoft Word® file. The images are thus potentially stored in a non-optimal order.

[Content_Types].xml
_rels/.rels
word/_rels/document.xml.rels
word/document.xml
word/theme/theme1.xml
word/media/image1.png
word/media/image2.png
word/media/image3.png
word/media/image4.png
word/media/image5.png
word/media/image6.png
word/media/image7.png
word/media/image8.png
word/media/image16.png
word/media/image17.png
word/media/image19.png
word/media/image20.png
word/media/image21.png
word/media/image22.png
word/media/image23.png As can be seen, the ordering of the objects is not in a contiguous format. The file format in these types of files 102 is not consistent and varies based on use. This issue is also very prevalent in many file types. For example, PDF files 102 typically include an index of how the file is organized that is at the end of the PDF file 102. This issue can be overcome by moving the index to the beginning of the PDF file 102 (or any identified place in the file). Even if the file 102 is mostly in the correct order, a minor change may cause the whole file 102 to have to be received before any display can occur. For example, a simple front change for the file 102 may be stored at the end of the file 102. Thus, in order to display the PDF file 102, the whole PDF file 102 needs to be received before the first page in the PDF file 102 can be displayed.

Although the process has been described as reordering the file format in a contiguous manner from the beginning to the end, other options are possible. For example, the file format may be the opposite of where the last page/slide are reordered to have the last page at the beginning that is contiguous to the first page. Alternatively, the organization may have a specific page/slide or groups of slides at the beginning/end of the file 102 depending on how the application 121/user 104 is going to use the file 102.

The reordering may be based on a context of the application 121. For example, in a display context, the ordering may be where the slides/pages are order contiguously from slide/page 1 to the last slide/page. In a storage context, the ordering may be where the ordering is based on a compression algorithm, size of each page/slide, and/or the like. The context may be based on how a user 104 is going to use the application 121. For example, the context may change in an email application 121 based on whether the user 104 is forwarding an email versus adding an attachment of a specific type to a new email. The context may be dynamic and change based on how the application 121 is going to use the file 102.

Another option would be using a time or time period. For example, the application 121 may need a different organization of the file during a specific time that the file 102 is being used (e.g., during working hours).

Another option would be where a configuration of the application 121 is used to define how to reorder the file 102. For example, the user 104 may want to be able to configure specific display characteristics for the files 102 or file types (e.g., the user 104 wants the last edited slide to be shown first). In this case, the last edited slide would be reordered to the beginning of the file 102. How the file format of the file 102 is reorganized may be based on a type of license for the application 121. The context could further apply to the user 104. For example, different users 104 may configure their usage differently. Thus, the reorganization of the file 102 (could be the same file 102) may be different depending on user preferences.

The reordering may be based on how the file 102 by used by a second application 121 that works with the application 121. For example, graphical image from a graphical editing application 121 may be cut and pasted into a word processing application 121. Thus, the reordering for the file 102 may change after the graphical image is cut and pasted into the word processing application 121.

Another reason that this problem occurs is that some files 102 are optimized for writing and not for reading. Thus, depending on the context of the application 121, the ordering of the file format may not be conducive depending on whether the application 121 is going to read from the file 102 or write to the file 102. The reordering may be based on whether the file 102 is executable. In other words, the formatting may be dynamic based on how the file 102 is being used.

These types of issues also exist in other types of files 102, such as, video files 102, graphic files 102, image files 102, audio files 102, and/or the like. For example, for video files 102, the file format may be based on frames/images. A video/audio application 121 may want to start at a specific point in a video/audio file 102 rather than waiting to download the whole video/audio file 102. Thus, there is a clear need for the ability to dynamically reorder the file format to reduce the time needed for the application 121 to start actively using the file 102 rather than waiting for the full file 102 or a significant portion of the file 102 to be downloaded.

The reordering of information may include deleting information in the file 102, such as, where the information is duplicated. For example, if identical objects are embedded in a Microsoft Word® document, the duplicate information may be deleted from the Microsoft Word® document. Another option for deleting information may be where the information is not needed by the application 121 to perform a specific task. For example, the information may be information that is for display and where the text is white text on a white background or for objects that are off the edge of a page.

The file format module 103 and/or the file management module 122 may take into account the structure, capability, and/or state of the network 110 in determining how files 102 should be reordered. For example, if communication across the network 110 is very fast and reordering the file 102 would take a long time, the file format module 103 may not perform any reordering. If a file 102 is sufficiently large or complicated for the beginning to have been processed by the application 121 before its end has been reordered by the file format module 103, feedback from the application 121 based on the start of the file 102 might lead to a change in the method of reordering applied to the end of the file 102 by the file format module 103. In other words, the reformatting may be dynamic while the file 102 is being sent.

The file format module 103 determines if a request to send a file 102 has been received in step 204. The request may be received in various ways. For example, the request may come from the application 121 (either local or remote), from the user 104, based on an event (e.g., an event from a program/application 121), and/or the like. If a request to send the file 102 has not been received in step 204, the process goes back to step 202. If a request to send a file 102 has been received in step 204, the file format module 103 identifies, in step 206, the file type (e.g., a PDF file 102, a JPEG file 102, a ZIP file 102, a TAR file 102, etc.). The file type may be identified in various ways. For example, the file type may be identified by a suffix of the name (e.g., a .pdf, a .wpd, a .gif, a .wav, etc.). The file type may be based on reading the file 102 or looking at a structure of the file 102. This can then be compared to know file structures to identify the file type.

The file format module 103 identifies the application 121/application type in step 208. The application 121 may a specific application 121 or may be a type of application 121. In one embodiment, the reordering may be based on a type of application 121 or multiple types of applications 121. For example, the reordering may be accomplished the same way for all video streaming applications 121. The reordering may be accomplished for multiple applications 121 that are different types in the same way. For example, the reordering may occur in the same manner for all word processing/spreadsheet applications 121 even though the file format is different.

The file format module 103 reorders the file format of the file 102 based on the application 121 that will be receiving the file 102 in step 210. The file format module 103 then sends the reordered file 102 to the application 121 in step 212.

The file format module 103 determines, in step 214 if the process is complete. If the process is not complete, the process goes back to step 202. Otherwise, if the process is complete in step 214, the process ends in step 216.

The process of FIG. 2 is described where the reordering is done on the communication device 101. In another embodiment, the reordering may done on the server 120 where the request to send the file 102 comes from the communication device 101. For example, the application 121 may reside on the communication device 101 and the reordered file 102 is sent from the server 120 to the communication device 101.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
 a microprocessor; and
 a non-transitory computer readable medium, coupled with the microprocessor and comprising instructions that, when executed by the microprocessor, cause the microprocessor to:
  receive file format information of a plurality of file types for a plurality of applications;
  in response to receiving a first request to send a first file to a first destination, determine which application of the plurality of applications will receive the first file at the first destination;
  in response to a determination that a first application of the plurality of applications will receive the first file at the first destination, identify, based on the file format information of the plurality of file types for the plurality of applications, an optimized file format of the first file for the first application to receive the first file at the first destination;
  in response to identifying the optimized file format of the first file for the first application to receive at the first destination, determine whether components of the first file retrieved from storage are in a sequence order of the optimized file format of the first file;

in response to a determination that the components of the first file retrieved from storage are not in the sequence order of the optimized file format of the first file, reorder a sequence of the components of the first file retrieved from storage into the sequence order of the optimized file format of the first file; and following reordering the sequence of the components of the first file retrieved from storage into the sequence order of the optimized file format of the first file, transmit the first file to the first destination.

2. The system of claim 1, wherein the instructions further cause the microprocessor to:

in response to receiving second request to send a second file to a second destination, determine that a second application at the second destination will receive the second file;

retrieve components of the second file from the storage;

identify an optimized file format of the second file for the second application to receive the second file at the second destination;

in response to identifying the optimized file format of the second file for the second application to receive the second file at the second destination, reorder the retrieved components of the second file into the optimized file format of the second file; and following reordering the retrieved components of the second file into the optimized file format of the second file, transmit the second file to the second destination.

3. The system of claim 2, wherein the second application is different from the first application.

4. The system of claim 1, wherein the instructions cause the microprocessor to reorder the sequence of the components of the first file retrieved from storage into the sequence order of the optimized file format of the first file based on at least one of:

a contiguous ordering from a first object to a last object;
a contiguous ordering from the last object to the first object;
a moving of an index;
moving one or more objects to a specific location;
a context of the first application;
a specific user of the first application;
a time period;
configuration information;
display characteristics;
storage characteristics;
network characteristics;
identical information in the first file;
an inaccessible object;
an invisible object;
how a second application works with the first application;
executing the first file;
reading the first file; and
writing the first file.

5. The system of claim 1, wherein the first file is a ZIP file and wherein the instructions that cause the microprocessor to reorder the sequence of the components of the first file retrieved from storage comprise instructions that cause the microprocessor to reorder the components of the first file retrieved from storage from a first component to a last component.

6. The system of claim 1, wherein the first file is a portable document format (PDF) file and wherein the instructions that cause the microprocessor to reorder the sequence of the components of the first file retrieved from storage comprise instructions that cause the microprocessor to move one or more index components of the first file to a beginning of the first file.

7. The system of claim 1, wherein the instructions that cause the microprocessor to reorder the sequence of the components of the first file retrieved from storage comprise instructions that cause the microprocessor to move text data components of the first file to a beginning of the first file.

8. The system of claim 1, wherein the instructions that cause the microprocessor to reorder the sequence of the components of the first file retrieved from storage comprise instructions that cause the microprocessor to:

identify multiple components of the first file that are to display a first page of the first file; and
move the identified multiple components of the first file to a beginning of the first file.

9. The system of claim 8, wherein the identified multiple components are in multiple different places within the first file.

10. A method comprising:

receiving, by a microprocessor, file format information of a plurality of file types for a plurality of applications;

in response to receiving a first request to send a first file to a first destination, determining, by the microprocessor, which application of the plurality of applications will receive the first file at the first destination;

in response to a determination that a first application of the plurality of applications will receive the first file at the first destination, identifying, by the microprocessor, based on the file format information of the plurality of file types for the plurality of applications, an optimized file format of the first file for the first application to receive the first file at the first destination;

in response to identifying the optimized file format of the first file of for the first application to receive at the first destination, determining, by the microprocessor, whether components of the first file retrieved from storage are in a sequence order of the optimized file format of the first file;

in response to a determination that the components of the first file retrieved from storage are not in the sequence order of the optimized file format of the first file, reordering, by the microprocessor, a sequence of the components of the first file retrieved from storage into the sequence order of the optimized file format of the first file; and following reordering the sequence of the components of the first file retrieved from storage into the sequence order of the optimized file format of the first file, transmitting, by the microprocessor, the first file to the first destination.

11. The method of claim 10, further comprising:

in response to receiving a second request to send a second file to a second destination, determining that a second application at the second destination will receive the second file;

retrieving components of the second file from the storage;

identifying an optimized file format of the second file for the second application to receive the second file at the second destination;

in response to identifying the optimized file format of the second file for the second application to receive the second file at the second destination, reordering the retrieved components of the second file into the optimized file format of the second file; and following reordering the retrieved components of the second file into the optimized file format of the second file, transmitting the second file to the second destination.

12. The method of claim 11, wherein the second application is different from the first application.

13. The method of claim 10, wherein reordering the sequence of the components of the first file retrieved from storage into the sequence order of the optimized file format of the first file is based on at least one of:
- a contiguous ordering from a first object to a last object;
- a contiguous ordering from the last object to the first object;
- a moving of an index;
- moving one or more objects to a specific location;
- a context of the first application;
- a specific user of the first application;
- a time period;
- configuration information;
- display characteristics;
- storage characteristics;
- network characteristics;
- identical information in the first file;
- an inaccessible object;
- an invisible object;
- how a second application works with the first application;
- executing the first file;
- reading the first file; and
- writing the first file.

14. The method of claim 10, wherein the first file is a ZIP file and wherein reordering the sequence of the components of the first file retrieved from storage comprises reordering the components of the first file retrieved from storage from a first component to a last component.

15. The method of claim 10, wherein the first file is a portable document format (PDF) file and wherein reordering the sequence of the components of the first file retrieved from storage comprises moving one or more index components of the first file to a beginning of the first file.

16. The method of claim 10, wherein reordering the sequence of the components of the first file retrieved from storage comprises moving text data components of the first file to a beginning of the first file.

17. The method of claim 16, wherein reordering the sequence of the components of the first file retrieved from storage comprises:
- identifying multiple components of the first file that are to display a first page of the first file; and
- moving the identified multiple components of the first file to a beginning of the first file.

18. The method of claim 17, wherein the identified multiple components of the first file are in multiple different places within the first file.

19. A non-transitory computer readable medium having stored thereon instructions that, when executed, cause a microprocessor to:

receive file format information of a plurality of file types for a plurality of applications;

in response to receiving a first request to send a first file to a first destination, determine which application of the plurality of applications will receive the first file at the first destination;

in response to a determination that a first application of the plurality of applications will receive the first file at the first destination, identify, based on the file format information of the plurality of file types for the plurality of applications, an optimized file format of the first file for the first application to receive the first file at the first destination;

in response to identifying the optimized file format of the first file for the first application to receive at the first destination, determine whether components of the first file retrieved from storage are in a sequence order of the optimized file format of the first file;

in response to a determination that the components of the first file retrieved from storage are not in the sequence order of the optimized file format of the first file, reorder a sequence of the components of the first file retrieved from storage into the sequence order of the optimized file format of the first file; and following reordering the sequence of the components of the first file retrieved from storage into the sequence order of the optimized file format of the first file, transmit the first file to the first destination.

20. The non-transitory computer readable medium of claim 19, wherein the instructions cause the microprocessor to reorder the sequence of the components of the first file retrieved from storage into the sequence order of the optimized file format of the first file based on at least one of:
- a contiguous ordering from a first object to a last object;
- a contiguous ordering from the last object to the first object;
- a moving of an index;
- moving one or more objects to a specific location;
- a context of the first application;
- a specific user of the first application;
- a time period;
- configuration information;
- display characteristics;
- storage characteristics;
- network characteristics;
- identical information in the first file;
- an inaccessible object;
- an invisible object;
- how a second application works with the first application;
- executing the first file;
- reading the first file; and
- writing the first file.

* * * * *